United States Patent
Kadyk et al.

(10) Patent No.: US 6,674,767 B1
(45) Date of Patent: Jan. 6, 2004

(54) FLEXIBLE SYSTEM AND METHOD FOR COMMUNICATING BETWEEN A BROAD RANGE OF NETWORKS AND DEVICES

(75) Inventors: Donald J. Kadyk, Bothell, WA (US); Neil S. Fishman, Bothell, WA (US); Leif Pederson, Woodinville, WA (US); Marc E. Seinfeld, Kenmore, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/411,594

(22) Filed: Oct. 4, 1999

(51) Int. Cl.[7] .............................................. H04L 12/00
(52) U.S. Cl. ................... 370/466; 709/230; 709/232; 709/321; 707/101; 707/513
(58) Field of Search ............................... 370/278, 395.5, 370/401, 465, 466; 709/230, 232, 246, 315, 321; 707/101, 103, 513, 523

(56) References Cited

U.S. PATENT DOCUMENTS

| | | | | |
|---|---|---|---|---|
| 5,416,917 A | * | 5/1995 | Adair et al. ................. 707/203 |
| 5,535,375 A | * | 7/1996 | Eshel et al. ................... 703/27 |
| 5,771,459 A | * | 6/1998 | Demery et al. ............. 455/517 |
| 5,848,415 A | * | 12/1998 | Guck .......................... 707/10 |
| 5,911,776 A | * | 6/1999 | Guck ......................... 709/217 |
| 5,951,645 A | * | 9/1999 | Goto .......................... 709/230 |
| 6,044,088 A | * | 3/2000 | Rahman et al. ............. 370/465 |
| 6,097,797 A | * | 8/2000 | Oseto ..................... 379/100.08 |
| 6,310,888 B1 | * | 10/2001 | Hamlin ....................... 370/466 |
| 6,333,919 B2 | * | 12/2001 | Gaffney ....................... 370/254 |
| 6,339,795 B1 | * | 1/2002 | Narurkar et al. ............ 709/246 |
| 6,356,529 B1 | * | 3/2002 | Zarom ........................ 370/231 |
| 6,453,356 B1 | * | 9/2002 | Sheard et al. ............... 709/231 |
| 6,526,026 B1 | * | 2/2003 | Menon ........................ 370/310 |

* cited by examiner

*Primary Examiner*—Chi Pham
*Assistant Examiner*—Anh-Vu H Ly
(74) *Attorney, Agent, or Firm*—Workman Nydegger (57) ABSTRACT

A flexible gateway accommodates data transfer from a data origination device over a wide variety of networks to a wide variety of destination devices, even if those networks use different protocols, and even if the devices recognize different data formats. Thus, the gateway can perform work previously requiring numerous gateways. After the gateway receives information from a data source, the gateway identifies the specific device type and the specific network type to which the information is to be routed. The gateway then calls device and network drivers associated with the specific device and network identified with the destination device. These drivers then manipulate the data using the device driver into the format recognized by the destination device, and then provide the manipulated data to the destination device over the identified network using the compatible protocol. Thus, the destination device properly receives and interprets the information provided by the data source. If, in the very next moment, data arrives at the gateway that is to be routed over a different network using a different protocol to a different device recognizing a different device, the gateway will call different device and network drivers to enable the communication.

32 Claims, 5 Drawing Sheets

| | 504 | 506 | 508 |
|---|---|---|---|
| | USER NAME | GENERAL DEVICE DESCRIPTION | SPECIFIC ADDRESS |
| | ⋮ | ⋮ | ⋮ |
| 502 → | JOHN DOE | CELLULAR PHONE | 1-800-555-1212 |
| | ⋮ | ⋮ | ⋮ |

FIG. 5

| | 604 | 606 | 608 | 610 |
|---|---|---|---|---|
| | SPECIFIC ADDRESS | SPECIFIC DEVICE TYPE | SPECIFIC NETWORK TYPE | REGISTRATION DATA |
| | ⋮ | ⋮ | ⋮ | ⋮ |
| 602 → | 1-800-555-1212 | ABC ALPHATEXT PHONE 5000 | WIRELESS NETWORK XYZ | ••• |
| | ⋮ | ⋮ | ⋮ | ⋮ |

FIG. 6

FLEXIBLE SYSTEM AND METHOD FOR COMMUNICATING BETWEEN A BROAD RANGE OF NETWORKS AND DEVICES

BACKGROUND OF THE INVENTION

1. The Field of the Invention

The present invention relates to data processing systems. Specifically, the present invention relates to a gateway for flexibly interfacing a broad range of data origination devices with a broad range of data destination devices over a broad range of networks.

2. The Prior State of the Art

Human beings communicate with each other using a set of rules called a protocol. For example, in one culture, it might be proper to initiate a conversation with a business contact by shaking hands. During the conversation, it might be proper to listen and abstain from speaking while the contact is speaking, and to make eye contact. To end the conversation, it might be proper to state a closing remark such as "good bye" or "I'll see you later." A protocol also governs the way that computers communicate or exchange data within a given network. For example, a standard Internet protocol is termed HyperText Transport Protocol or HTTP.

Returning to the business contact analogy, from culture to culture, there may be a different protocol for initiating a conversation with a business contact. For example, in one culture, a hand shake will suffice. In another, a slight bow, a simultaneous hand shake, and a subsequent business card exchange might be appropriate. In yet another, a kiss on the cheek might be appropriate. What is proper in one culture may be completely inappropriate and unthinkable in another. Computer networks may also vary in protocol from network to network. Yet, it is important, especially with the advent and proliferation of the Internet, that devices from different networks communicate with each other even if they use different protocols.

A gateway is a device that acts as a go-between between different networks. A data origination device will communicate information over a network to the gateway using the protocol appropriate for that network. The gateway will then relay that information over another network to the destination device using a protocol appropriate for the second network. Sometimes the protocols for the first and second networks are the same; but often, they are different. Thus, the gateway permits communication of data over multiple networks even if those networks have different protocols.

Gateways are not functionally limited to just translating protocols, but may also perform a variety of other functions such as converting the message data from the format generated by the origination device into a format recognizable by the destination device. For example, the gateway may convert a graphics file from Graphics Interchange Format (GIF) to Bitmap (BMP) format.

Gateways have greatly facilitated inter-network communication. However, conventional gateways are highly inflexible as they can only deal with specific protocols. For example, a gateway that receives data using the HTTP protocol, and transmits that data using another specific protocol such as Kermit File Transfer Protocol (Kermit FTP) can only receive data using HTTP, and can only transmit using Kermit FTP. The gateway would not transmit using HTTP or any other protocol except Kermit FTP.

Another inflexibility in conventional gateways is that the gateway only converts data formats from one specific format to another specific format. For example, a gateway that converts data from the Rich Text Format (RTF) into the American Standard Code for Information Interchange (ASCII) format only converts from RTF format into ASCII format.

Due to this inflexibility, device manufacturers are impeded from introducing new devices that recognize a proprietary data format type. Specifically, the device manufacturer might have to construct numerous gateways to enable data to be translated into the new format recognizable by the new device. The number of gateways needed for a particular device is a function of the number of data formats provided to the gateway, the number of protocols used to communicate the data to the gateway, and the number of protocols used to communicate the data from the gateway to the particular device.

Furthermore, a new carrier provider having its own protocol might also have to provide a number of gateways. This number is a function of the number of data formats and protocols with which data is communicated to the gateway, and the number of data formats recognizable by each device with which the carrier communicates.

In the wireless world, there is a host of wireless devices available, many of which only recognize their own proprietary data format. Furthermore, there are many wireless carriers available, each using its own protocol. Therefore, the number of conventional gateways needed to accommodate every wireless carrier and every wireless device is immense. Thus, the burden to provide gateways is great.

It is desirable to reduce the number of gateways needed to exchange data with a wide range of networks and devices such as in the wireless world.

SUMMARY OF THE INVENTION

In accordance with the present invention, a flexible gateway is provided. The gateway accommodates data transfer from a data origination device over a wide variety of networks to a wide variety of destination devices, even if those networks use different protocols, and even if the devices recognize different data formats. Thus, the gateway can perform work previously requiring numerous gateways. The gateway is particularly useful in communicating over wireless networks to wireless devices since these networks and devices in aggregate have numerous proprietary protocols and data formats. However, the advantage of the gateway can be incorporated into wired networks as well, as will be recognized to one skilled in the field of computer networks from having read this disclosure.

After the gateway receives information from a data source, the gateway identifies the specific device type of the destination device, and the specific network type of the destination network on which the destination device resides. For example, if the information is intended to go to John Doe's cellular phone, the gateway would determine the specific type of cellular phone that John Doe is using (e.g., ABC ALPHATEXT PHONE 50000), and the specific network that is connected to the phone (e.g., WIRELESS NETWORK XYZ). Alternatively, the specific device type and network type may be included with the information provided to the gateway.

The gateway calls the appropriate device and network drivers associated with the specific device and network to create a chain of driver modules customized to the destination device and destination network. This driver chain then manipulates the data into the format recognized by the destination device, and then provides the manipulated data to the destination device over the destination network using the compatible protocol. Thus, the target device properly receives and interprets the information provided by the data source.

If, in the very next moment, data arrives at the gateway that is to be routed over a different network using a different protocol to a different device recognizing a different format, the gateway would call different device and network drivers to customize a chain of drivers for that particular destination device and network.

One important benefit is that this gateway may communicate data to a wide variety of devices over a wide variety of networks. The number of devices and networks with which the gateway can work is limited only by the number of device and network drivers available to the gateway. This flexibility is particularly beneficial in the wireless world where formats and protocols tend to vary device-to-device and network-to-network. The gateway is also flexible in that it may facilitate both unidirectional and bi-directional communication. Information may be communicated from the data origination device to the destination device as described above. However, depending on the capability of the destination device, the destination device may also communicate information to the origination device. That information might be, for example, a request for the information that the origination device is to send to the destination device.

The gateway may also call customized drivers other than the device and network drivers. For example, if the destination device is loaded with certain encryption software for decoding a certain type of encryption, the gateway may first, identify whether encryption is desired for a given message based on the device capabilities, then identify the appropriate encryption driver for the certain type of encryption, and then call the appropriate encryption module.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

A flexible gateway accommodates data transfer from a data origination device over a wide variety of networks to a wide variety of destination devices, even if those networks use different protocols, and even if the devices recognize different data formats. Thus, the gateway can perform work previously requiring numerous gateways. The gateway is particularly useful in communicating over wireless networks to wireless devices since these networks and devices in aggregate have numerous proprietary protocols and data formats. However, the advantage of the gateway can be incorporated into wired networks as well, as will be recognized to one skilled in the field of computer networks from having read this disclosure.

The invention is described below by using diagrams to illustrate either the structure or processing of embodiments used to implement the systems and methods of the present invention. Using the diagrams in this manner to present the invention should not be construed as limiting of its scope. The present invention contemplates both methods and systems for forwarding messages from an origination device to a destination device. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Such a medium may include a wireless carrier signal, for example. When information is transferred or provided over a network or another communications connection (either hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
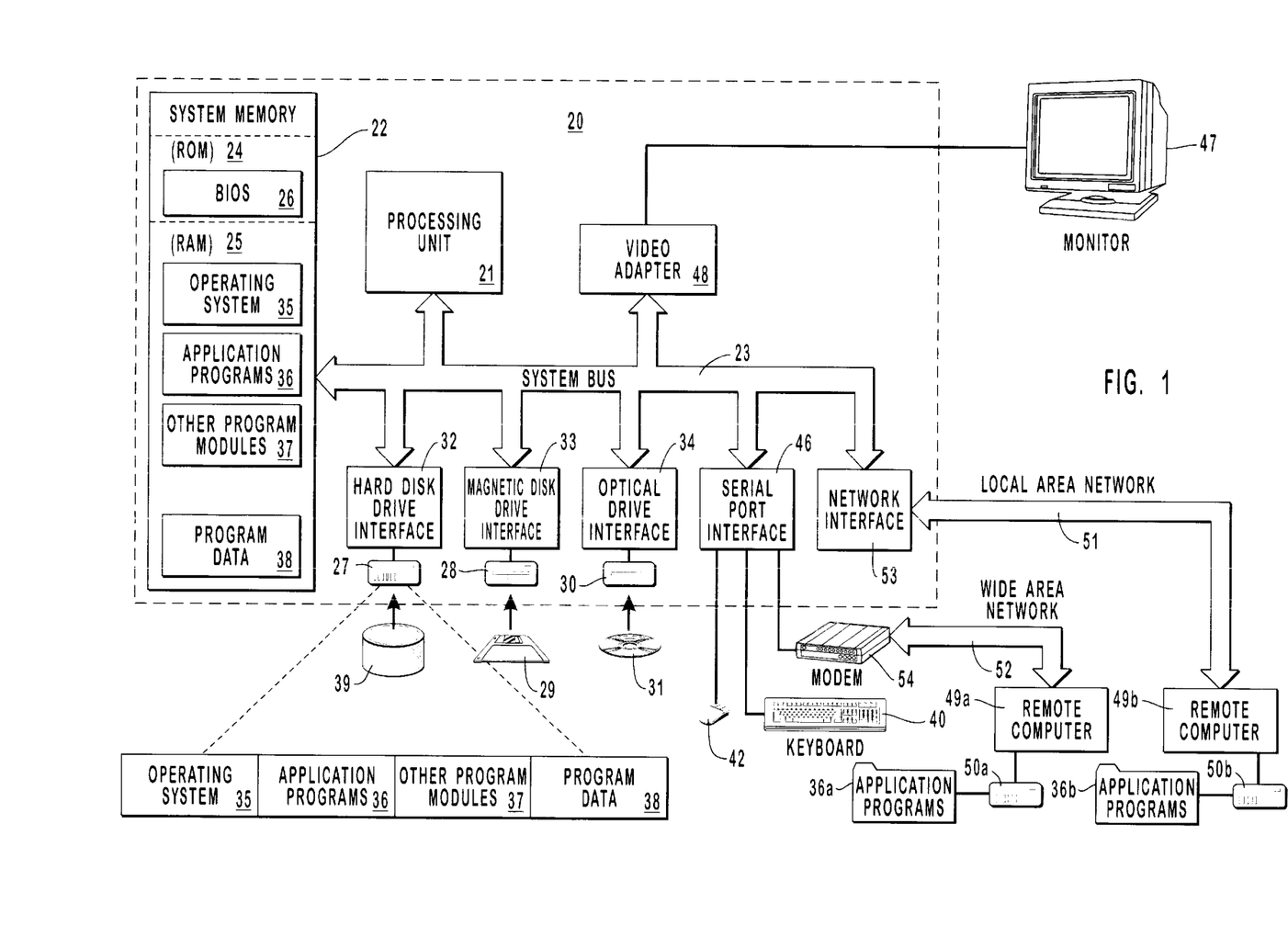
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired or wireless links) through a communications network. In a distributed computing environment, program modules may be located in both local and remote memory storage devices.

FIG. 1 illustrates a conventional computer 20 that includes components and data processing capabilities that may be used to implement embodiments of the invention. Computer 20 is a general purpose computing device that includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joystick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b an their association application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include, for example, a modem 54 or a wireless link. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means for establishing communications over wide area network 52 may be used.

Figure 2:
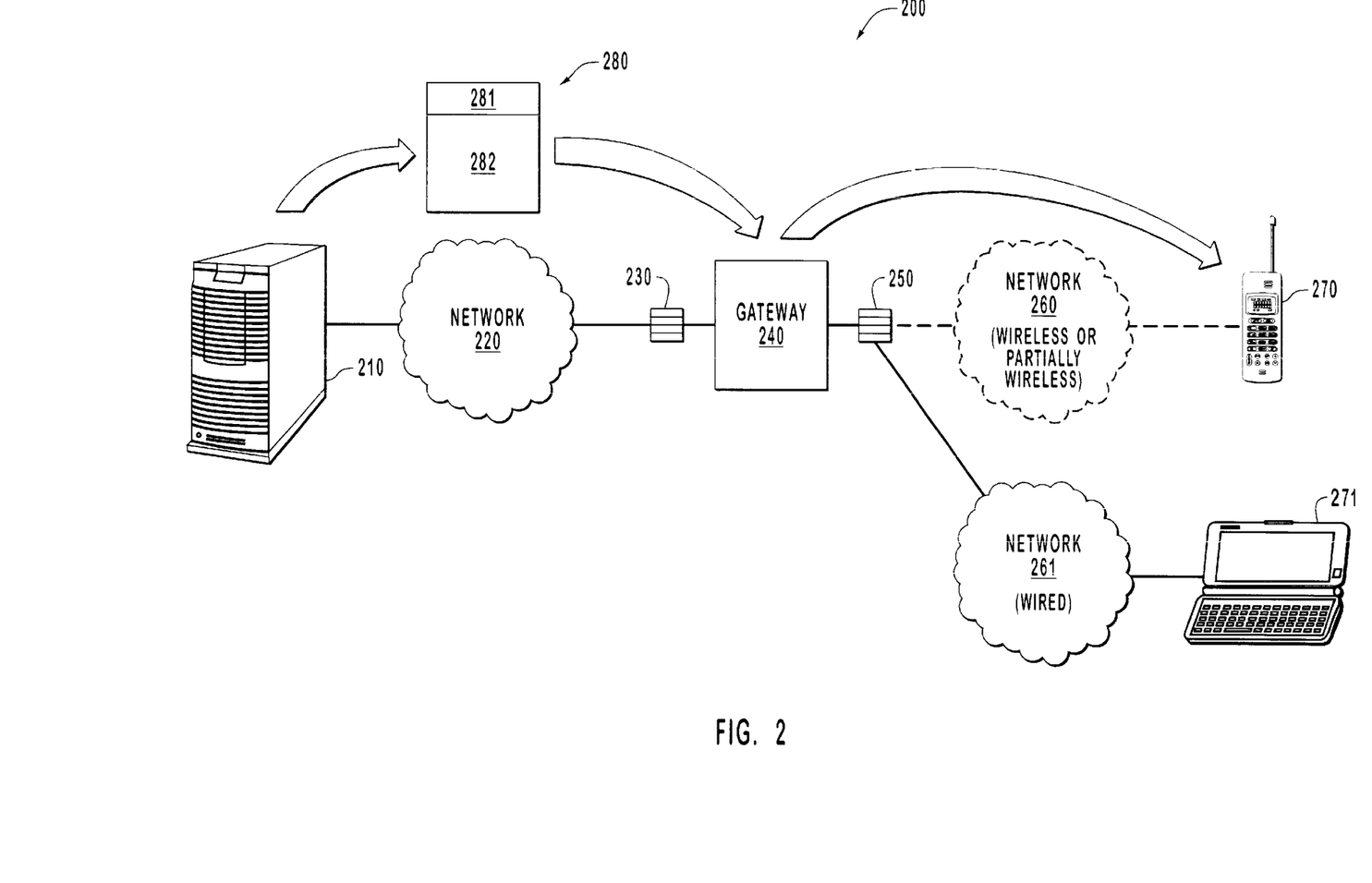
FIG. 2 is a schematic diagram showing the passage of a message through a gateway in accordance with the present invention.

FIG. 2 shows a schematic diagram of an environment 200 for a gateway 240 according to the present invention. The gateway 240 may comprise, for example, a computer like the computer 20 of FIG. 1 and interacts with networks 220, 260, and 261 external to the computer 20 as shown in FIG. 2. Alternatively, gateway 240 may be implemented in any other suitable processing device or system that performs the functions disclosed herein. The gateway 240 of the present invention is flexible, accommodating many types of data format conversions and many types of protocol conversions.

In the environment 200 of FIG. 2, an originating device 210 forwards a message 280 through an originating network 220, through a sending queue 230, and to the gateway 240. The message 280 can include any data whether it be text, graphics, executables, or otherwise. The gateway 240 processes the message 280 and forwards the message 280 through a remote queue 250, through a remote network 260, and to the remote device 270. Remote network 261 and remote device 271 will also be described below. In this description, "originating" corresponds to either the left or right side of the gateway 240, and "remote" corresponds to the receiving or destination network and device(s) which may also be on the left or right side of the gateway 240. "Originating" and "remote" are used in this description and in the claims merely to distinguish one item from the other and do not necessarily represent any actual physical position.

In order to generate the message 280, embodiments within the scope of the invention include means for generating the message 280. One example of such a means is shown in FIG. 2 as the originating device 210. The originating device 210 performs acts towards accomplishing the step of generating the message 280 as described herein. The originating device 210 may be any one of numerous devices that can output an electronic message in a specific format. As just one particular example, the originating device 210 may be a server having a version of Microsoft® Exchange Server loaded thereon. In the case of Microsoft® Exchange Server, the proximate device 210 may generate e-mail messages in the Multipurpose Internet Mail Extensions (MIME) format, calendar entries in the iCal format, contact entries in the vCard format and so forth. The type and number of formats in which the message 280 can be generated is limited only by the software and hardware capabilities of the originating device 210.

The message 280 may be generated in a "push" fashion meaning the message 280 is generated in response to a predetermined event other than a request for the message 280. For example, the originating device 210 might generate the message 280 at a predetermined time such as every hour on the hour. The message 280 might also be generated in response to an e-mail message arriving, or in response to any other stimulus recognized by the originating device 210. The message 280 may also be generated in a "pull" fashion in which the message 280 is generated in response to a specific request for information contained in the message 280.

Regardless of whether the originating device 210 generates the message 280 in response to a request or in response to any other stimulus, the originating device 210 generates a body 282 of the message 280 along with a means for addressing the destination device 270 or 271, one example of which is shown as address 281 in FIG. 2. All that is needed of address 281 is that it identifies the location of a remote destination device 270 or 271 either directly or indirectly by reference to another mechanism such as a look-up table. For example, the address 281 might be the specific uniform resource locator (URL) or phone number of the remote destination devices 270 or 271. Alternatively, the address 281 might be more generic such as "John Doe— Cellular Phone" in which the address 281 must be compared to a look-up table to obtain the specific address as described further below.

The message 280 is transmitted to the gateway 240 so that the message 280 (or its associated address information) can be processed by the gateway 240 in preparation for routing the message 280 to a remote device 270 or 271. Accordingly, embodiments within the scope of the present invention include a means for transmitting the message 280 from the originating device 210 to the gateway 240. An example of such a means is shown in FIG. 2 as the originating network 220. First, the originating network 220 receives the message 280 from the originating device 210 using a protocol compatible with the originating network 220. The originating network 220 may be any medium capable of transmitting the message 280 whether all wired, all wireless, or partially wireless. The originating network 220 may be a wide area network, a local area network, or a combination of both and use any protocol such as, for example, HyperText Transport Protocol (HTTP). In another example of the means for transmitting the message from the originating device 210 to the gateway 240, originating device 210 and the gateway 240 are both disposed within a common device such as a server. In this case, the originating network 220 is located internal to the server.

Optionally, for scalability purposes, the means for transmitting the message 280 to the gateway 240 may also include a sending queue 230. The sending queue 230 may receive messages from several originating networks and/or several originating devices so that the messages are available at the gateway 240, and so that the messages may be provided to several gateways as shown in FIG. 3.

Figure 3:
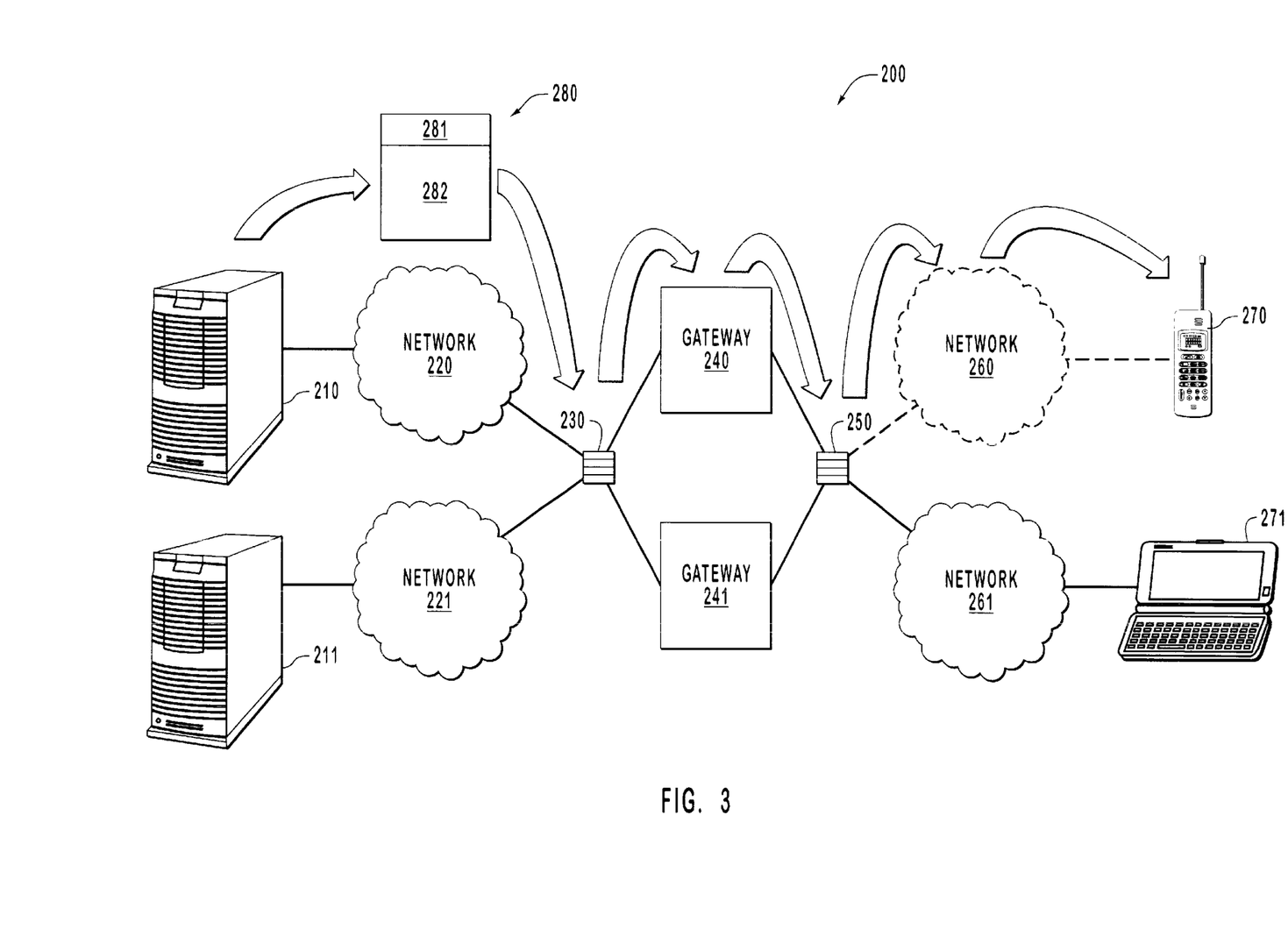
FIG. 3 is a schematic diagram demonstrating the scalability of the gateway shown in FIG. 1 in accordance with the present invention.

FIG. 3 shows that the environment 200 is scalable in that the number of originating networks and the number or gateways handling messages from these networks may be adjusted as needed. Specifically referring to FIG. 3, the sending queue 230 receives messages from a plurality of originating devices 210 and 211 over a plurality of originating networks 220 and 221, respectively. Also FIG. 3 shows that the sending queue 230 can feed messages to a plurality of gateways 240 and 241. Although only two originating networks, originating devices, and gateways are shown, it will be apparent from this description that the number of originating devices, originating networks, and gateways may be scaled up or down as appropriate.

For example, if the gateway 240 is fast enough to process messages from many originating networks, there may be many originating networks inputting messages to the sending queue 230 and a fewer number of gateways dequeueing messages from the sending queue 230. On the other hand, if the gateway 240 is not fast enough to process messages from an originating network, there may be relatively few originating networks providing messages to the proximate queue 230, and a larger number of gateways (e.g., gateways 240 and 241) dequeueing messages from the sending queue 230. The sending queue 230 may be any queue capable of receiving messages, storing messages, and holding those messages out for dequeueing by the gateway 240. For example, sending queue 230 might be a Microsoft® Message Queue (MSMQ) developed by Microsoft Corporation. The gateway 240 then dequeues the message 280 from the originating queue 230.

After processing by the gateway 240 or 241, the message is fed into a remote queue 250 which is also provided for scalability purposes to allow the number of remote destination devices services by the gateways to be scaled up or down as appropriate. The remote queue 250 will be described in more detail further below.

The gateway performs several functions which will be described in greater detail to with respect to FIGS. 4, 5 and 6. At a high functional level, the gateway 240 determines the address of the remote device 270 so that the message 280 can be properly routed. Thus, embodiments within the scope of the present invention include means for determining a specific address of the destination device 270.

In this description and in the claims, "specific address" means any address which comprises enough information to properly route the associated message over a remote network 260 or 261 to a remote device 270 or 271. Examples of a specific address include a phone number or uniform resource locator (URL). If the address 281 associated with the message 280 is specific, the means for determining a specific address of a destination device 270 or 271 may simply include reading the address 281 from the message 280.

"Generic address" means any address which requires the aid of a reference source to properly route the associated item to its destination. For example, "John Doe's home phone number in Chicago" may be sufficient to properly route a message via a phone call only if a Chicago phone book is referenced to obtain the specific phone number. If the address 281 is generic, the means for determining a specific address of a destination device 270 or 271 may perform specific acts such as reading the generic address, and looking up the specific address associated with the generic address in a table or other information source.

As described above, in order to be in a format recognized by a remote device 270 or 271, the format of the message 280 must often be changed. Thus, embodiments within the scope of the invention include means for manipulating the message 280 to be in a format recognized by any such remote destination device. These and other means are described in further detail with respect to FIG. 4.

In order to be properly transmitted to a remote device 270 or 271, the message 280 must be transmitted over a remote network 260 using a protocol recognized by the particular remote network 260 or 261. Accordingly, embodiments within the scope of the present invention include means for transmitting the message 280 using a protocol compatible with the desired remote network 260 or 261. These and other means are described in detail with respect to FIG. 4.

However, as an example of the functionality of gateway 240 described in reference to FIG. 3, suppose that originating device 210 creates an e-mail message 280 in a MIME format (a standard Internet e-mail format enabling attachments), and transmits the message 280 over the originating network 220 to the gateway 240 using the standard Internet HyperText Transport Protocol (HTTP). Suppose further that the remote network 260 uses a proprietary wireless protocol #1, and that the remote device 270 recognizes data in a proprietary wireless format #2. In this case, the gateway 240 converts the message 280 from MIME format to the proprietary format #2, and transmits the message 280 over the remote network 280 using the proprietary protocol #1.

Subsequently, the gateway 240 might convert another message destined for another remote device 271 over another remote network 261 even if the other remote device 271 does not recognize proprietary data format #2, and even if the other remote network 261 does not use proprietary protocol #1. The gateway 240 dynamically adjusts as needed to reformat the message 280 and provide the reformatted message 280 using the proper protocol as described herein.

After gateway 240 has manipulated the message 280 to be in a format recognized by a remote device 270 or 271, the message 280 is transmitted. Accordingly, embodiments within the scope of the present invention include means for transmitting the message 280 to a remote device 270 or 271. An example of this means is shown in FIG. 2 as a remote network 260 or 261.

The gateway 240 transmits the reformatted message 280 using a protocol compatible with the particular remote network described, such as 260 or 261. The remote networks 260 or 261 may be any network capable of transmitting the message 280 to the remote devices 270 or 271 whether all wired, all wireless, or partially wireless. The originating network 220 may be a wide area network, a local area network, or a combination of both and may use any protocol such as, for example, HTTP, or proprietary wireless carrier protocols. Since wireless carriers typically have their own proprietary protocols, and since there are many types of wireless devices each recognizing their own data formats, the flexible gateway 240 of the present invention is particularly useful in communicating with wireless devices.

Optionally, for scalability purposes at the remote side of gateway 240, the means for transmitting the message 280 to the remote device 280 may also include a remote queue 250. The remote queue 250 may receive messages from several gateways and may provide those messages to several remote networks as shown in FIG. 3. Thus, if the gateway 240 is fast enough to process messages for many remote networks, there may be relatively few gateways inputting messages to the remote queue 250 and a larger number of remote networks that receive messages from the remote queue 250. On the other hand, if the gateway 240 is not fast enough to process messages for a single remote network, there may be a larger number of gateways inputting messages to the remote queue 250, and a relatively small number of remote networks drawing messages from the remote queue 250. The remote queue 250 may be any queue capable of receiving, storing, and providing the message 280 to the remote network 260. For example, proximate queue 250 might also be a Microsoft® Message Queue (MSMQ) developed by Microsoft Corporation.

After the message 280 is transmitted over a remote network 260 or 261, it is received by a destination device 270 or 271. Accordingly, embodiments within the scope of the present invention include means for receiving the message 280. This means is shown in FIG. 2 as a remote device 270 or 271. The remote device 270 may be any wireless device such as a cellular phone with or without alphanumeric text receiving capability, a text pager, a lap top computer, a hand held computer, or any other wireless device. The remote device 271 may be a "wired" device such as a desk top computer, a conventional telephone, a computer server, or any other wired device. In this description and in the claims, a "wired" device includes any device that is not wireless and that is capable of receiving an electronic message.

Figure 4:
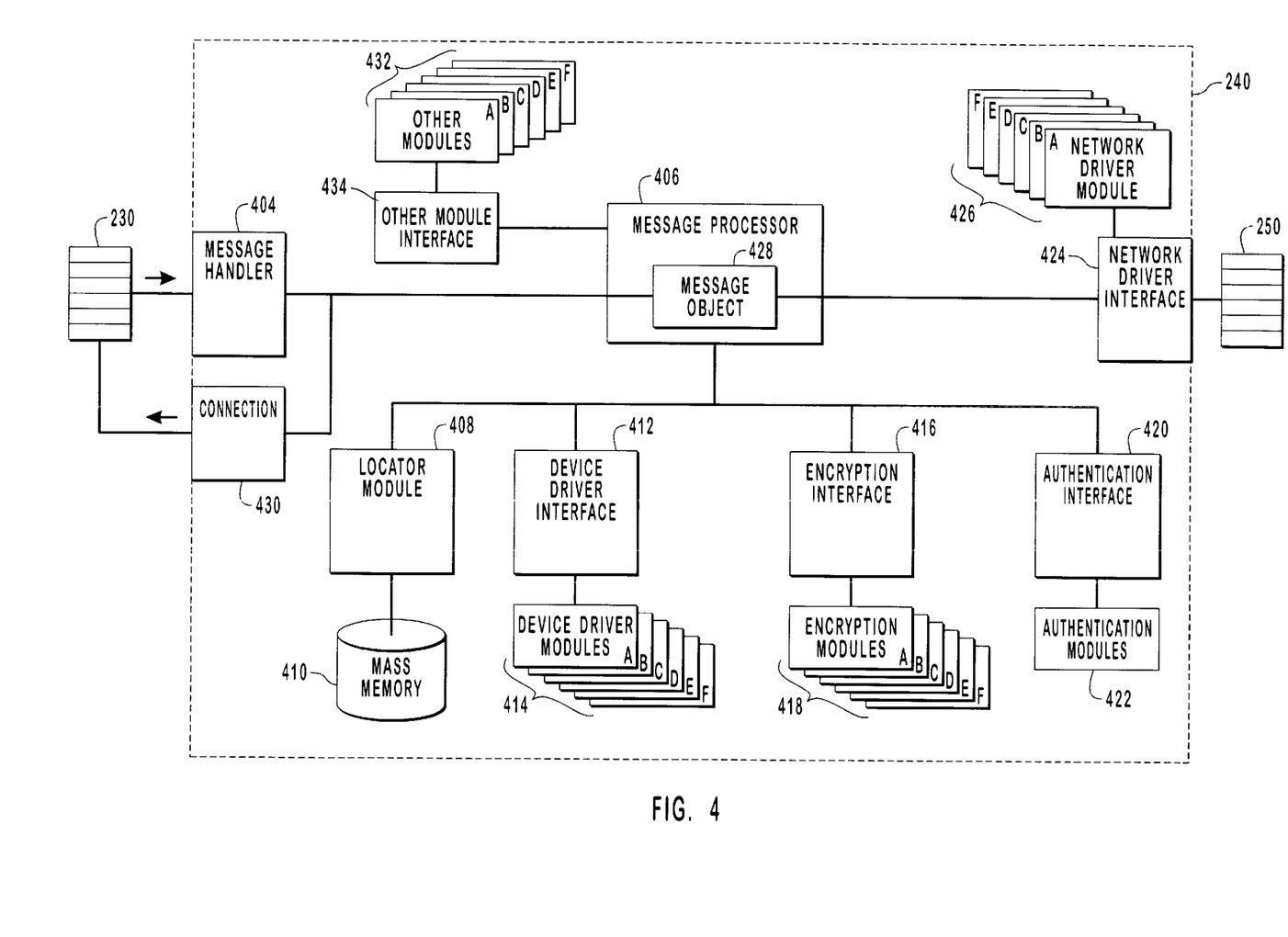
FIG. 4 is a schematic diagram of the gateway of FIG. 2 and FIG. 3 having a locator module and capable of calling through standardized interfaces from libraries of device modules, network driver modules, and encryption modules.

FIG. 4 is a more detailed schematic diagram of the gateway 240 and queues 230 and 250 of FIG. 2. An originating message handler 404 dequeues the message 280 from the sending queue 230 and feeds the message 280 to a message processor 406. Devices and modules for reading data from a queue and writing the message to another unit are well-known to those skilled in the art. The message processor 406 uses the locator module 408 to access information in the mass memory 410, uses the device driver interface 412 to interface with one of the device modules A–F located in device driver library 414, uses an encryption interface 416 to interface with one of the encryption modules A–F located in the encryption module library 418, uses an authentication interface 420 to interface with an authentication module 422, and uses a network driver interface 424 to interface with one of the network driver modules from the network driver library 426. Note that although interfaces 408, 412, 416, 420, 424 and 434 are shown as being boxes, they really represent a standardized structure for calling modules and retrieving information. These calling functions may be performed using an Application Program Interface or API.

The specific operation of an exemplary gateway 240 is now described. In order to route the message 280 to an appropriate destination device 270 or 271 (FIG. 2), the specific address of the destination device is to be determined. Accordingly, embodiments within the scope of the present invention include a means for determining a specific address of a destination device such as devices 270 or 271. For example, if the address 283 associated with the message 280 is a specific address, then the means for determining the specific address includes an act of reading the address 281 by the message processor 406 and the corresponding hardware and/or software that performs this act.

Alternatively, if the address 281 associated with the message is a generic address, the means for determining the specific address is more complex. For example, after reading the message 280, the message processor 406 transmits the message 280, along with the address 281 to the locator module 408 associated with the mass memory 410. The mass memory 410 may be any suitable device, examples of which include the magnetic hard disk drive 27, the system memory 22, the removable magnetic disk 29, or the removable optical disk 31 of FIG. 1. The table located on the mass memory 410 associates the generic address with a specific address.

Figure 5:
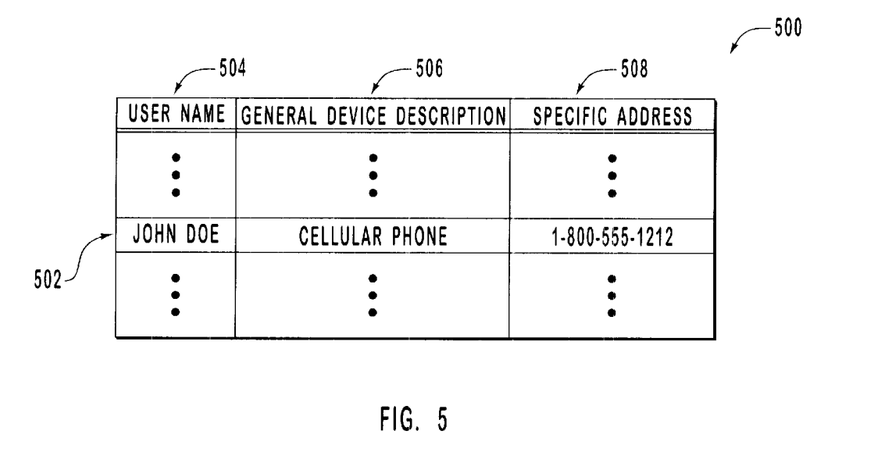
FIG. 5 is a diagram of a table represented by a data structure residing in the mass memory of FIG. 4, the table associating a generic address with a specific address of the destination device of FIG. 2 and FIG. 3.

FIG. 5 shows such an address table 500. The two left hand columns 504, 506 list generic parameters of such as a user name in column 504 and a general device description in column 506. For example, in row 502 of the address table 500, the generic parameters are "John Doe" and "Cellular Phone". The locator module 408 reads the specific address associated with the generic address from the specific address column 508 of the address table 500. For example, if the generic address of the address 281 is John Doe's cellular phone, the specific address read from table 500 will be a telephone number such as 1-800-555-1212. The locator module 408 provides this specific address to the message processor 406. There may be numerous rows of the address table 500, each having an associated entry corresponding a generic address to a specific address.

The remote devices 270 or 271 recognize data presented only in certain formats. If this format is different from the format of the message 280 generated by the originating device, the message 280 needs to be manipulated to be in the format recognized by the remote device 270 or 271. Accordingly, embodiments within the scope of the present invention include means for manipulating the message 280 such that the message 280 is in a format recognized by a remote device such as devices 270 or 271. An example of such a means is also described with reference to FIG. 4.

The means for manipulating the message 280 may include executable code and/or hardware for transporting the message 280 from memory location to memory location between each manipulation. However, in FIG. 4, a message object 428 is used to represent the message 280 in all stages of manipulation. The message object 428 may be, for example, an abstract data type. Thus, one memory location is allocated to the message 280 instead of a memory location being allocated for each manipulation of the message 280.

In order to further manipulate the message 280 now stored within the message object 428 in such a fashion, the gateway 240 determines an appropriate chain of one or more modules needed to properly manipulate and route the message 280. In order to determine this chain, the device module that can manipulate the message 280 must be in a format recognizable by the remote device 270 or 271. Accordingly, embodiments within the scope of the present invention include means for identifying the device module. Note that by identifying the specific type of the remote device, one has also identified the device since the identity of the device module has a well known association with the identity of a device. For example, device manufacturers typically widely publish over the Internet the names of device drivers that can operate with each of their products.

Referring to FIG. 4, examples of such a means for identifying the device module associated with a remote destination device 270 are now described. If the message 280 already includes a specific identification of a remote device such as device 270, then the means may include executable code and/or hardware for performing the act of identifying the device driver associated with the specific identification of the remote device 270 by simply reading the specific identification of the remote device 270 from the message 280.

Otherwise, if the address 281 associated with the message 280 is a specific address, the message processor 406 provides the specific address 281 to the locator module 408 to look up the specific type of the remote device 270 in the mass memory 410 using a data structure representing an identification table. Alternatively, if the message processor 406 previously provided a generic address to the locator module 408, the specific address read from the address table 500 (FIG. 5) may be used to look up the specific type of the remote device 270.

Figure 6:
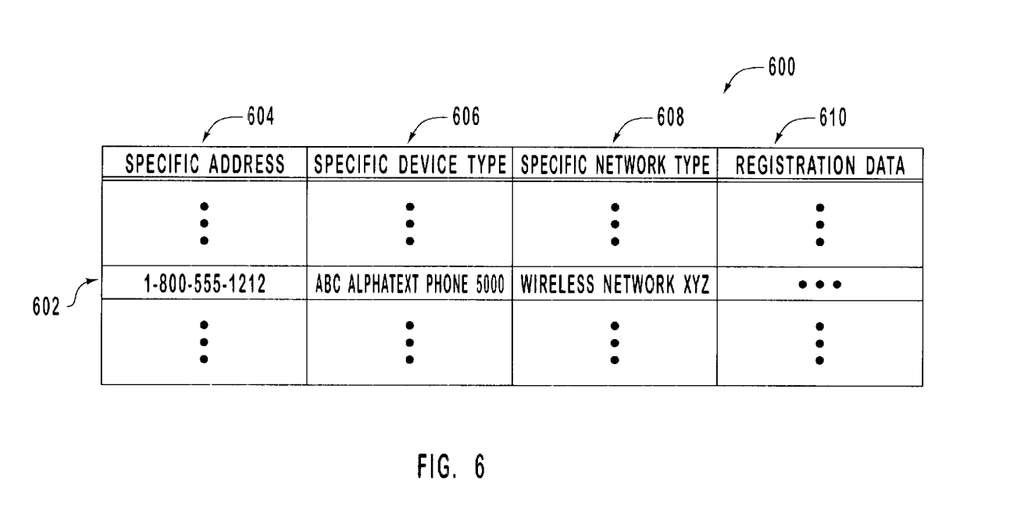
FIG. 6 is a diagram of a table represented by a data structure residing on the mass memory of FIG. 4, the table associating the specific address of the destination device with a specific device type of the destination device and a specific network type of the network upon which the destination device resides.

FIG. 6 shows an example of an identification table that may be used to look up the specific type of a remote device 270 or 271. The left hand column 604 lists the specific address of the remote device. For example, row 602 of column 604 lists the specific address 1-800-555-1212 identified in column 508, row 502 of the address table 500. It will be apparent that tables 500 and 600 can be integrated into one table if desired. The column 606 lists the specific type of the remote device such as device 270 associated with the specific address such as, for example, "ABC Alphatext Phone 50000." Thus, the locator module 408 reads the specific type of the remote device 270 from the identifier table 600 and provides the result to the message processor 406. The message processor 406 determines the name of the device module based on the identification of the remote device 270 according to well known techniques such as looking up the name of the device module in a table. Alternatively, the device module name may be provided in column 606 of the identifier table 600 instead of the identification of the remote device 270.

In order to determine the appropriate driver chain as described above, it may be necessary to identify the network driver module that can manipulate the message 280 to be in a format recognizable by the remote device 270. Accordingly, embodiments within the scope of the present invention include a means for identifying the network driver module. The means for identifying the network driver module may be similar to the means for identifying the device module described above. For example, after the specific address is determined, column 608 corresponding to row 602 of the identification table may be referenced to determine the specific identification of the remote network, or the specific identification of the remote network driver module. For example, the column 608 lists the specific type of the remote network 260 on which the remote device 270 resides such as, for example, "Wireless Network XYZ." Thus, the locator module 308 reads the specific types from column 604 and 606 of identifier table 600 and provides the specific types to the message processor 406. The names "ABC Alphatext Phone 50000" and "Wireless Network XYZ" are intended to be fictional and are not intended to represent any real device or network. These names are provided for illustrative purposes only.

It should be noted that the determination of the appropriate driver chain may be performed in one step at the same time as the device module is determined by looking up the specific address in the table 600 of FIG. 6. This allows the appropriate device module, network driver module to be determined at the same time by accessing the table 600 just once.

The identifier table 600 of FIG. 6 also includes a column 610 for registration data. Registration data may include device specific information regarding the receipt of messages at a remote device 270 or 271. For example, the registration data might include what encryption technique should be used, if any, in encrypting the message 280. This encryption technique would correspond to decryption software present on the remote device 270. Other preferences might include whether attachments in the message 280 are to be ignored. For example, the remote device 270 may not be able to represent an attachment.

In this fashion, the message processor 406 may determine the identification of the device module associated with a remote device 270 or 271, the identification of the network driver module associated with a remote network 260 or 261, the identification of any encryption modules that are to be used, and an indication of other registration data associated with the type of a remote device 270 or 271.

In order to use the chain of modules appropriate for a remote device 270 or 271, a remote network 260 or 261, and the associated preferences, embodiments within the scope of the present invention include means for accessing the device module associated with the remote device 270. For example, after determining the appropriate device module, the message processor 406 calls that device module from a device module library 414 through a device driver interface 412. The message 280 is then provided as the message object 428 to the appropriate device module through the device driver interface 412. The device module then manipulates the message 280 to be in a format recognized by the remote device 270, and provides the reformatted message 280 back through the device driver interface 412 to the message processor 406 as the message object 428.

The device driver interface 412 may be, for example, a COM interface and the device modules may be COM modules. Software applications may be built using components. Each component is capable of performing one or more functions in assisting the software application. COM is a specification for building components and for creating applications from these components. An advantage of using COM components is that the components can be dynamically linked to the application while the application is running by being called by the application. The COM module and the application are linked through a COM interface. Thus, the appropriate device module may be dynamically linked with the message processor 406 as the message processor 406 is running.

There are other structures and methods for accessing the appropriate device module. For example, all of the device modules in the entire device driver library 414 may be permanently linked to the message processor 406 thus eliminating the need to dynamically link the appropriate device module. Alternatively, more commonly accessed device drivers may be permanently linked to the message processor 406 while less commonly accessed device modules may be dynamically linked through the COM interface.

Each device module may be provided by a gateway device builder, or alternatively, may be provided by a remote device manufacturer. Device modules corresponding to a particular device are typically available from the manufacturers of that device. For example, such device modules may be downloaded from a World Wide Web site hosted by the manufacturer. The design of a device driver interface 412 is arbitrary. All that is required is that the device module 414 export an interface that complies with the device driver interface 412 supported by the current invention.

The device module called by the message processor 406 and provided with the message 280 is the first module in the chain. The preference data obtained from the identifier table 600 of FIG. 6 may indicate that encryption is desired. If encryption is desired the preference data will also identify the encryption module within the encryption module library 418 that corresponds to encryption software available on the remote device 270. Thus, embodiments within the scope of the present invention include means for encrypting the message 280. Specifically, the message processor 406 calls the identified encryption module of the encryption module library 418 through the encryption interface. As described above for the device modules, all or some of the encryption modules may be permanently linked with the message processor 406. The function of the authentication module 422 will be described further below.

The gateway 240 may also include other libraries of modules 432 that the message processor 406 interfaces with through an interface 434. For example, the gateway 240 may include a library of compression modules. The mode of compression corresponding to a particular type of remote device 270 or 271 may be identified in the registration data read from the locator module 410. The appropriate compression module corresponding to the compression software on the remote device 270 may then be called and the message 280 passed to the compression module for compression.

Ultimately, after manipulation by the appropriate device module, and possible manipulation by appropriate encryption and/or compression modules, and other modules as desired, the message 280 is in a format that a remote device 270 or 271 can handle. The reformatted message is then provided to a desired remote device such as devices 270 over the remote network 260. The remote network 260 may include numerous devices which communicate with each other using a specific protocol. Therefore, the message 280 is transmitted over the remote network 260 using a protocol compatible with the remote network 260. Accordingly, embodiments within the scope of the present invention include means for transmitting the message 280 using a protocol compatible with the remote network 260. An example of such a means is described with reference to FIG. 4.

The gateway 240 first identifies the network driver associated with a remote device 270 or 271. The message processor 406 then accesses the appropriate network driver using a means for accessing an appropriate network driver module for a remote device. For example, the message processor 406 calls the network driver module from a network driver library 426 through a network driver interface 424. The message 280 is then provided through the remote queue 250 to a remote network such as network 260 in the proper protocol. The network driver modules may be COM modules, and the network driver interface 424 may also be COM interfaces. Ultimately, the message is received at the remote device 270 and the message 280 can be interpreted by the remote device 270 and by any user that is associated with the remote device 270.

Referring to FIG. 2, the originating device 210 is the origination device and the remote device 270 is the destination device when the message 280 is transmitted from the proximate device 210 to the remote device 270. However, messages may also be transmitted from a remote device 270 or 271 to the originating device 210. In this case, device 270 or 271 is the originating device and device 210 is the destination device. Such messages may include a request for the data such as e-mail messages, contact entries, or calendar entries. In addition, the destination device 210 may be a remote server residing anywhere on the Internet such as an Instant Messaging Server or a Web server. The message 280 could include an instant message in the case of an Instant Messaging Server, or a Web page in the case of a Web server. However, the message 280 may include any other message types.

In order to transmit a message from an originating device 270 or 271 to a remote destination device 210, the originating device 270 or 271 first generates a message in a particular format. The device 270 or 271 then transmits that message over the network 260 or 261 to the remote queue 250 using a specific protocol. The gateway 240 then dequeues the message from the queue 250 and provides the message to the message object 428 of the message processor 406.

The message may include a specific address of the device 270 or 271 along with an identification of the device 270 or 271. The message 280 is provided to the locator module 408 which determines the proper device module, the proper encryption module, and any other modules associated with the originating device 270. The message processor 406 then constructs a chain of modules by calling the appropriate device module, and any other modules as appropriate.

Proper security may be obtained by transmitting the message from the device 270 or 271 using encryption software. Optionally, some level of security may be obtained by an authentication module 422 which is accessible to the message processor 428 through the authentication interface 420. The authentication module may check for a password which gives the device 270 or 271 permission to access the information requested in the message 280.

In the event that access is granted, the manipulated message is then transmitted by a connector 430 (e.g., an HTTP connector) to the proximate queue 230 using the protocol appropriate for the network 220 such as HTTP. The message is then transmitted over the network 220 to the destination device 210 where the message may be processed.

As described above, the message processor 406 references the locator module 408 for address data about the proximate 210, and for preference and module data about the device 270 or 271. Thus, the message processor 406 does not need to refer to the locator module 408 to determine this information when processing the response to this inbound message assuming that the message processor 280 retains the data from the locator module 410 until after the response is processed, and assuming that the message processor 408 recognizes the response is a response to the message.

In summary, a flexible gateway is provided which enables communication over a broad range of networks between a broad range of devices. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a networked computer system that includes one or more originating devices for originating data or messages, and wherein the originating devices are logically connected to and communicate using one or more originating protocols with one or more originating networks logically connected to a gateway, the gateway in turn being logically connected to one or more remote networks that are logically connected to and that communicate to one or more remote destination devices using one or more receiving protocols, at least some of which are different from the originating protocols, a method of forwarding the originating data or messages from the one or more originating devices through the gateway to the one or more remote destination devices notwithstanding the differences used in the originating and receiving protocols, the method comprising the following:

a step for generating, at one or more of the originating devices, data or a message intended for at least one remote destination device;

a step for communicating the generated data or message through one or more originating networks to a gateway using the one or more of the originating protocols;

a step for identifying at the gateway a device type, a network type, or both, for the at least one remote destination device;

a step for identifying, from a plurality of device modules at the gateway for manipulating data and messages into any of a plurality of formats or protocols for diverse device and network types, a device module associated with the device type, network type, or both, identified for the intended remote destination device; and a step for using the identified device module to manipulate the data or message so that the data or message is then transmitted from the gateway through the one or more remote networks to the intended remote destination device using a protocol and a format recognized by the intended remote destination device, irrespective of differences in the originating and receiving protocols.

2. The method of claim 1, wherein the step for communicating comprises the following:

an act of communicating the generated data or message through one or more originating networks to the gateway using Hypertext Transfer Protocol (HTTP).

3. The method of claim 1, further comprising the following:

a step for transmitting the data or message over the one or more remote networks to the intended remote destination device using the protocol and the format recognized by the intended remote destination device.

4. The method of claim 3, wherein the step for transmitting comprises the following:

an act of transmitting the data or message over a wireless network to the intended remote destination device.

5. The method of claim 3, wherein the step for transmitting comprises the following:

an act of transmitting the data or message over a remote network that is at least partially wireless.

6. In a networked computer system that includes one or more originating devices for originating data or messages, and wherein the originating devices are logically connected to and communicate using one or more originating protocols with one or more originating networks logically connected to a gateway, the gateway in turn being logically connected to one or more remote networks that are logically connected to and that communicate to one or more remote destination devices using one or more receiving protocols, at least some or which are different from the originating protocols, a computer program product for implementing a method of forwarding the originated data or messages from the one or more originating devices through the gateway to the one or more remote destination devices notwithstanding the difference used in the originating and receiving protocols, the computer program product comprising:

a computer readable medium for providing computer program code means utilized to implement said method; and wherein said computer program code means is comprised of executable code for implementing the following:

a step for generating, at one or more of the originating devices, data or a message intended for at least one remote destination device;

a step for communicating the generated data or message through one or more originating networks to a gateway using one or more originating protocols;

a step for identifying at the gateway a device type, a network type, or both, for the at least one remote destination device;

a step for identifying, from a plurality of device modules at the gateway for manipulating data and messages into any of a plurality of formats or protocols for diverse device and network types, a device module associated with the device type, network type, or both, identified for the intended remote destination device; and a step for using the identified device module to manipulate the data or message so that the data or message is then transmitted from the gateway through the one or more remote networks to the intended remote destination device using a protocol and a format recognized by the intended remote destination device, irrespective of differences in the originating and receiving protocols.

7. The computer program product of claim 6, wherein the executable code for implementing the step for communicating comprises executable code for implementing the following:

an act of communicating the generated data or message through one or more originating networks to the gateway using HyperText Transfer Protocol (HTTP).

8. The computer program product of claim 6, further comprising executable code for implementing the following:

a step for transmitting the data or message over the one or more remote networks to the intended remote destination device using the protocol and the format recognized by the intended remote destination device.

9. The computer program product of claim 8, wherein the executable code for implementing the step for transmitting comprises executable code for implementing the following:

an act of transmitting the data or message over a wireless network to the intended remote destination device.

10. The computer program product of claim 9, wherein the executable code for implementing the step for transmitting comprises executable code for implementing the following:

an act of transmitting the data or message over a remote network that is at least partially wireless.

11. A networked computer system for permitting data or messages that are originated using one or more originating protocols to be communicated across one or more networks to a remote destination that uses a receiving protocol different from the originating protocols, comprising:

one or more originating devices for originating data or messages using one or more originating protocols;

one or more originating networks logically connected to the one or more originating devices and which communicate therewith using the one or more originating protocols;

gateway means logically connected to the one or more originating devices through the one or more originating networks, for receiving the originated data or messages using the one or more originating protocols, said gateway means comprising:

means for determining a specific address for each received data or message so that a destination device or network type may be identified for the received data or message;

means for identifying from a plurality of device modules at the gateway for manipulating received data and messages into any of a plurality of formats or protocols for diverse device and network types, a device module associated with each received data or message's destination device type, network type, or both; and means for manipulating each received data or message so that each received data or message is then transmitted from the gateway through one or more remote networks to an intended remote destination device using a protocol and a format recognized by the intended remote destination device, irrespective of differences in the originating and receiving protocols;

one or more remote networks logically connected to the gateway; and at least one or more remote destination devices logically connected through the one or more remote networks.

12. The networked computer system of claim 11, wherein at least one of the one or more remote networks are wireless.

13. The networked computer system of claim 11, wherein all of the one or more remote networks are wireless.

14. The networked computer system of claim 11, wherein the at least one or more remote destination devices comprise a cellular phone.

15. In a networked computer system that includes one or more originating devices for originating data or messages, and wherein the originating devices are logically connected to and communicate using one or more originating protocols with one or more originating networks logically connected to a gateway, the gateway in turn being logically connected to one or more remote networks that are logically connected to and that communicate to one or more remote destination devices using one or more receiving protocols, at least some of which are different from the originating protocols, a computer program product for implementing on the gateway a method of forwarding the originating data or messages from the one or more originating devices through the gateway to the one or more remote destination devices notwithstanding the differences used in the originating and receiving protocols, the computer program product comprising:

a computer readable medium for providing computer program code means utilized by said gateway to implement said method; and wherein said computer program code means is comprised of executable code for implementing the following:

a step for receiving at the gateway data or a message generated at one or more of the originating devices, the received data or a message intended for at least one remote destination device;

a step for identifying at the gateway a device module associated with the intended remote destination device, comprising:

an act of reading an address of the intended remote destination device from the data or message;

an act of looking up the address in a locator table associating the address with a specific device type, the specific device type corresponding to the device module associated with the destination device; and an act of reading the specific device type from the locator table; and a step for using the identified device module to manipulate the received data or message so that the data or message is then transmitted from the gateway through the one or more remote networks to the intended remote destination device using a protocol and a format recognized by the intended remote destination device, irrespective of differences in the originating and receiving protocols.

16. The computer program product of claim 15, wherein the executable instructions for performing the step for using the identified device module to manipulate the received data or message comprises computer executable instructions for performing the following:

an act of calling the device module from a library of device modules; and an act of interfacing with the device module through an interface.

17. The computer program product of claim 15, wherein the executable instructions for performing the step for using the identified device module to manipulate the received data or message comprises executable instructions for performing the following:

an act of calling a component object model compliant (COM) device module corresponding to the specific device type from a library of COM device modules; and an act of interfacing with the COM device module through a COM interface.

18. The computer program product of claim 15, wherein the executable instructions for performing the step for receiving at the gateway data or a message generated at one or more of the originating devices comprises executable instructions for performing the following:

an act of receiving the data or message at a sending queue associated with the gateway.

19. The computer program product of claim 18, wherein tho executable instructions for performing the step for receiving at the gateway data or a message generated at one or more of the originating devices comprises executable instructions for performing the following:

an act of the gateway dequeueing the data or message from the sending queue.

20. The computer program product of claim 19, wherein the executable instructions for performing the act of receiving the data or message at a sending queue further comprising executable instructions for performing the following:

an act of the sending queue delivering data or messages to a plurality of gateways including the gateway.

21. In a networked computer system that includes one or more originating devices for originating data or messages, and wherein the originating devices are logically connected to and communicate using one or more originating protocols with one or more originating networks logically connected to a gateway, the gateway in turn being logically connected to one or more remote networks that are logically connected to and that communicate to one or more remote destination devices using one or more receiving protocols, at least some of which are different from the originating protocols, a computer program product for implementing on the gateway a method of forwarding the originating data or messages form the one or more originating devices through the gateway to the one or more remote destination devices notwithstanding the differences used in the originating and receiving protocols, the computer program product comprising:

a computer readable medium for providing computer program code means utilized by said gateway to implement said method; and wherein said computer program code means is comprised of executable code for implementing the following:

a step for receiving at the gateway data or a message generated at one or more of the originating devices, the received data or a message intended for at least one remote destination device;

a step for identifying at the gateway a device module associated with the intended remote destination device, comprising:

an act of reading an address of the intended remote destination device from the data or message;

an act of looking up the address in a locator table associating the address with a specific network type, the specific network type corresponding to the network driver module associated with the remote network; and an act of reading the specific network type from the locator table, and wherein the executable instruction for performing the step for identifying a device module associated with the intended remote destination device comprise executable instruction for performing the following:

an act of looking up the address in the locator table, the locating table also associating the address with a specific device type, the specific device type corresponding to the device module associated with the intended remote destination device; and an act of reading the specific device type from the locator table;

a step for using the identified device module to manipulate the received data or message so that the data or message is then transmitted from the gateway through the one or more remote networks to the intended remote destination device using a protocol and a format recognized by the intended remote destination device, irrespective of differences in the originating and receiving protocols; and a step for transmitting the data or message to the intended remote destination device, comprising:

a step for transmitting the message to the intended remote destination device over a remote network on which the destination device resides, comprising:

a step for identifying a network driver module associated with the remote network; and a step for providing the message to the remote network using a protocol compatible with the remote network.

22. The computer program product of claim 21, wherein the device module and the network driver module each comprises a COM module.

23. The computer program product of claim 21, wherein the executable instructions for performing the step for transmitting the message to the intended remote destination device further comprises executable instructions for performing the following:

an act of transmitting the message to a message queue.

24. In a networked computer system that includes one or more originating devices for originating data or messages, and wherein the originating devices are logically connected to and communicate using one or more originating protocols with one or more originating networks logically connected to a gateway, the gateway in turn being logically connected to one or more remote networks that are logically connected to and that communicate to one or more remote destination devices using one or more receiving protocols, at least some of which are different from the originating protocols, a computer program product for implementing on the gateway a method of forwarding the originating data or messages from the one or more originating devices through the gateway to the one or more remote destination devices notwithstanding the differences used in the originating and receiving protocols, the computer program product comprising:

a computer readable medium for providing computer program code means utilized by said gateway to implement said method; and wherein said computer program code means is comprised of executable code for implementing the following:

an act of the gateway receiving data or a message generated at one or more of the originating devices, the received data or a message intended for at least one remote destination device;

an act of the gateway reading, from the data or message, an address that either directly or indirectly identifies a location of the intended remote destination device;

an act of the gateway determining a device type, a network type, or both, associated with the address of the intended remote destination device;

an act of the gateway identifying a device module that corresponds to the device type, network type, or both associated with the address of the intended remote destination device;

an act of the gateway using the identified device module to manipulate the received data or message; and an act of the gateway transmitting the data or message from the gateway through the one or more remote networks to the intended remote destination device using a protocol and a format recognized by the intended remote destination device, irrespective of differences in the originating and receiving protocols.

25. The computer program product of claim 24, further comprising executable code for implementing the following:

an act of the gateway transmitting the data or message over the one or more remote networks to the intended remote destination device using the protocol and the format recognized by the intended remote destination device.

26. The computer program product of claim 25, wherein the executable code for implementing the act of the gateway transmitting comprises executable code for implementing the following:

an act of the gateway transmitting the data or message over a wireless network to the intended remote destination device.

27. The computer program product of claim 26, wherein the executable code for implementing the step for transmitting comprises executable code for implementing the following:

an act of the gateway transmitting the data or message over a remote network that is at least partially wireless.

28. In a networked computer system that includes one or more originating devices for originating data or messages, and wherein the originating devices are logically connected to and communicate using one or more originating protocols with one or more originating networks logically connected to a gateway, the gateway in turn being logically connected to one or more remote networks that are logically connected to and that communicate to one or more remote destination devices using one or more receiving protocols, at least some of which are different from the originating protocols, a method of forwarding the originating data or messages from the one or more originating devices through the gateway to the one or more remote destination devices notwithstanding the differences used in the originating and receiving protocols, the method comprising the following:

an act of the gateway receiving data or a message generated at one or more of the originating devices, the received data or a message intended for at least one remote destination device;

an act of the gateway reading, from the data or message, an address that either directly or indirectly identifies a location of the intended remote destination device;

an act of the gateway determining a device type, a network type, or both, associated with the address of the intended remote destination device;

an act of the gateway identifying a device module that corresponds to the device type, network type, or both associated with the address of the intended remote destination device;

an act of the gateway using the identified device module to manipulate the received data or message; and an act of the gateway transmitting the data or message from the gateway through the one or more remote networks to the intended remote destination device using a protocol and a format recognized by the intended remote destination device, irrespective of differences in the originating and receiving protocols.

29. The method of claim 28, wherein the act of the gateway using the identified device module comprises the following:

an act of calling a COM device module corresponding to the intended remote destination device from a library of COM device modules; and an act of interfacing with the device module through a COM device driver interface.

30. The method of claim 28, further comprising the following:

a specific act of the gateway identifying other modules associated with the intended remote destination device; and a specific act of the gateway using the other modules to manipulate the received data or message.

31. The method of claim 30, wherein the other modules include an encryption module.

32. The method of claim 30, wherein the other modules include a compression module.

* * * * *